(12) United States Patent
Brown (10) Patent No.: US 9,877,468 B1
(45) Date of Patent: Jan. 30, 2018

(54) FISHING WEIGHT

(71) Applicant: Jeffery Robert Brown, Wildwood, MO (US)

(72) Inventor: Jeffery Robert Brown, Wildwood, MO (US)

( * ) Notice: Subject to any disclaimer, the term of this patent is extended or adjusted under 35 U.S.C. 154(b) by 0 days.

(21) Appl. No.: 15/269,503

(22) Filed: Sep. 19, 2016

Related U.S. Application Data (63) Continuation of application No. 12/759,217, filed on Apr. 13, 2010, now abandoned, which is a continuation of application No. 12/567,974, filed on Sep. 28, 2009, now abandoned.

(60) Provisional application No. 61/101,506, filed on Sep. 30, 2008.

(51) Int. Cl.
| | | |
|---|---|---|
| *A01K 85/00* | (2006.01) | |
| *A01K 95/00* | (2006.01) | |
| *A01K 91/04* | (2006.01) | |
| *A01K 85/02* | (2006.01) | |
| *A01K 83/00* | (2006.01) | |

(52) U.S. Cl.
CPC ............. *A01K 95/00* (2013.01); *A01K 85/02* (2013.01); *A01K 91/04* (2013.01); *A01K 83/00* (2013.01)

(58) Field of Classification Search
CPC ........ A01K 85/02; A01K 91/04; A01K 95/00; A01K 95/02
USPC ...................... 43/42.39, 42.24, 42.36, 44, 81
See application file for complete search history.

(56) References Cited

U.S. PATENT DOCUMENTS

| | | | | |
|---|---|---|---|---|
| 4,845,884 A | * | 7/1989 | Pacitti | A01K 93/00 43/44.88 |
| 5,129,175 A | * | 7/1992 | Pixton | A01K 85/00 43/42.24 |
| 5,152,094 A | * | 10/1992 | Strickland | A01K 85/00 43/42.24 |
| 5,233,785 A | * | 8/1993 | Ching | A01K 85/16 43/42.05 |
| 5,428,919 A | * | 7/1995 | Enomoto | A01K 85/01 43/42.31 |
| 5,490,345 A | * | 2/1996 | Infinger | A01K 85/00 43/42.24 |
| 5,899,015 A | * | 5/1999 | Link | A01K 85/00 43/42.28 |
| 6,006,465 A | * | 12/1999 | Brown | A01K 85/00 43/42.36 |
| 6,772,553 B2 | * | 8/2004 | Phillips | A01K 85/02 43/42.11 |
| 7,234,267 B1 | * | 6/2007 | Konstant | A01K 85/01 43/42.24 |
| 2004/0216360 A1 | * | 11/2004 | Holtzhampf | A01K 91/03 43/42.39 |
| 2006/0156611 A1 | * | 7/2006 | Harrell | A01K 85/00 43/42.36 |

(Continued)

*Primary Examiner* — Lisa L Tsang
(74) *Attorney, Agent, or Firm* — Marsh Fischmann & Breyfogle LLP (57) ABSTRACT

A fishing weight (100) that includes an oblong body (104), for instance in the shape of a football. A passage (116) extends through the oblong body (104) to allow fishing line (140) to extend through the passage (116). The passage (116) is positioned so that the fishing line (140) pulls the fishing weight (100) in a "sideways" orientation through the water. In one embodiment, the passage (116) proceeds other than linearly through the oblong body (104) of the fishing weight (100).

18 Claims, 6 Drawing Sheets

(56) References Cited

U.S. PATENT DOCUMENTS

2007/0289198 A1* 12/2007 Rodels .................. A01K 85/01
  43/42.36

* cited by examiner

FISHING WEIGHT

CROSS-REFERENCE TO RELATED APPLICATIONS

This patent application is a continuation of co-pending U.S. patent application Ser. No. 12/759,217, filed on Apr. 13, 2010, which is a continuation of U.S. patent application Ser. No. 12/567,974, filed on Sep. 28, 2009, and entitled "FISHING WEIGHT" (now abandoned), which claims the benefit of U.S. Provisional Patent Application Ser. No. 61/101,506, filed on Sep. 30, 2008, and entitled "FISHING WEIGHT". The entire disclosure of each of these patent applications is hereby incorporated by reference in their entirety herein.

FIELD OF THE INVENTION

The present invention relates generally to a fishing gear and, more particularly, to fishing weights.

BACKGROUND

A variety of fishing weights or sinkers currently exist in the recreational fishing industry. Such weights are typically used in conjunction with a hook or lure mounted on the end of a fishing line. Some fishing weights or sinkers are intended to be fixedly attached to the fishing line, while other weights or sinkers are adapted to be slidably mounted on the fishing line. Examples of fishing weights or sinkers include split shot, worm weights, tube weights, drop weights, Carolina weights, flipping weights, Finesse weights, inline fishing weights, nail weights, etc.

SUMMARY

The present invention is embodied by a fishing weight or sinker having an oblong body. This oblong body includes first and second ends, with a sidewall that extends between these first and second ends. A passage extends completely through the oblong body at first and second locations that are each located between the first and second ends.

A number of feature refinements and additional features are separately applicable to the present invention. These feature refinements and additional features may be used individually or in any combination. The oblong body of the fishing weight may be characterized as being football-shaped or in the shape of a football. The first and second ends of the oblong body in this case would be associated with the "nose" on each end of the football. A "midpoint" of the oblong body may be a location along a length of the oblong body that is half-way between the first and second ends of the oblong body. The oblong body may be characterized as being of a configuration where there is a progressive reduction of the effective diameter of the oblong body at least somewhere between the midpoint and each of the first and second ends of the oblong body, including where there is a progressive reduction all the way from the midpoint to each of the first and second ends. The "effective diameter" is the largest dimension of the oblong body at a given location along the length of the oblong body (e.g., the largest dimension of a cross-section of the oblong body taken orthogonally to its length dimension), and specifically does not require the oblong body to be circular at this given location.

The first and second ends of the oblong body may be characterized as being spaced along a central axis that extends through this oblong body. In one embodiment, the central axis is that axis about which the oblong body is at least substantially symmetrically disposed. The noted central axis may also be characterized as coinciding with a length dimension of the oblong body. The noted central axis also may be characterized as coinciding with a maximum dimension of the oblong body (e.g., where the first and second ends would be the portions of the oblong body that are spaced by the largest or maximum distance in relation to any other portions of the oblong body).

The passage that extends through the oblong body is subject to a number of characterizations. The passage may extend through the oblong body such that the fishing weight is moved "sideways" when being pulled through water (e.g., such that the sidewall of the oblong body, and not one of its ends, is the "leading portion" of the fishing weight as it moves through the water). The passage may proceed other than linearly through the oblong body. That is, the passage may be configured so as to not proceed along a linear or axial path through the entire extent of the oblong body. In this regard, the passage may be characterized as including first and second passage sections. Each of these first and second passage sections may extend along any appropriate path through the oblong body. In one embodiment, each of the first and second passage sections are linearly or axially extending.

There are a number of characterizations that may be made in relation to the above-noted first and second passage sections, including where each of the first and second passage sections are linearly extending or otherwise. The first and second passage sections may be arranged so as to not be disposed along a common axial or linear path. The first and second passage sections may also be characterized as being disposed in different orientations. There may be an included angle between the first and second passage sections, where the included angle is the smallest angle that may be measured between the first and second passage sections. In one embodiment, this included angle is greater than 90°. In one embodiment, this included angle in within a range of 120° to 150°, inclusive (i.e., both 120° and 150° are included in the noted range).

The first passage section may extend from a first location on the sidewall of the oblong body and into the oblong body, while the second passage section may extend from a second location on the sidewall of the oblong body and into the oblong body. In one embodiment, the first and second passage sections intersect at least generally at a center of the oblong body (e.g., at a location on the above-noted central axis).

The fishing weight may include a separate tube that is disposed within and/or that defines the noted passage. In one embodiment, the tube terminates at the sidewall of the oblong body at each of the first and second locations. In another embodiment, the tube terminates at the first location on the sidewall of the oblong body, but includes a first tube section that extends beyond the second location on the sidewall of the oblong body. The first tube section may extend any appropriate distance beyond the oblong body.

A spring of any appropriate type may be disposed on a perimeter of the above-noted first tube section. One end of this spring may be embedded or anchored in the oblong body. However, the spring could be fixed relative to the oblong body and/or the first tube section in any appropriate manner. Preferably, a free end of the first tube section (e.g., that which is disposed furthest from the oblong body) extends beyond a free end of the spring (e.g., that which is disposed furthest from the oblong body). This should reduce the potential of fishing line becoming entangled with the spring. In any case, artificial bait (e.g., a plastic worm, a soft bait, "plastics") may be pushed or screwed onto the first tube section and the overlying spring, including where one end of the artificial bait engages the oblong body and where its opposite end is spaced beyond a free end of the first tube section (e.g., so that the artificial bait may "flutter" when the fishing weight is moved through water). Generally, the spring may enhance the retention of the artificial bait on the first tube section. Other features may be utilized to facilitate the retention of artificial bait on the first tube section. For instance, an exterior surface of the first tube section may be serrated or knurled, may include one more threads or any other appropriate projection, or the like.

A tube may extend between and terminate at each of the first and second locations on the sidewall of the oblong body. Another option is for the passage to exist without such a tube (e.g., the passage may be integrally formed with the oblong body). In both cases, an appropriate spring (e.g., coil spring, compression spring, helical spring) may extend from the oblong body in alignment with the passage at the second location. This spring may be of any appropriate type, may extend any appropriate distance from the oblong body, and may have at least one end thereof fixed relative to the oblong body in any appropriate manner (e.g., by being embedded within the oblong body). This spring may be used to mount artificial bait of any appropriate type (e.g., a plastic worm) onto the fishing weight.

The first and second locations associated with the passage may each be on the sidewall of the oblong body. The passage may be characterized as terminating where the passage intersects with the sidewall at each of the first and second locations in this case. Consider the case where a hollow projection (e.g., cylindrical) extends from the oblong body in alignment with the passage at the second location. This hollow projection may be separately formed from and appropriately secured relative to the oblong body (e.g., the above-described tube). Alternatively, this hollow projection could be integrally formed with the oblong body (e.g., such that there is no joint of any kind between the oblong body and the hollow projection). In this second instance, the second location may still be where the passage intersects with the sidewall of the oblong body, although this passage may merge with the hollow interior of the hollow projection. An annular collar or rib may be formed on the exterior of this hollow projection, for instance to provide a "stop" for any skirt that may be tied onto the hollow projection (e.g., to reduce the potential that a tied-on skirt will "pull off" the free end of the hollow projection while pulling the fishing weight through the water). The above-described tube could extend within and/or beyond a free end of this hollow projection, and may include spring or other artificial bait retention member(s).

The fishing weight of the present invention may be incorporated by any appropriate fishing rig. This fishing rig may include fishing line that extends through the passage such that the fishing line is at least initially able to slide relative to the fishing weight. A hook may be tied to this fishing line after passing through the oblong body. Artificial bait of any appropriate type may be mounted on the hook in any appropriate manner, including where an end of the artificial bait extends to and abuts the oblong body of the fishing weight.

In one embodiment, fishing line extending to a fishing reel exits the passage in the oblong body of the fishing weight at the first location, whereas fishing line to which a hook is tied exits the passage in the oblong body of the fishing weight at the second location. When the passage is disposed at least generally at the "midpoint" between the first and second ends of the oblong body, this will pull the fishing weight through the water in a transverse orientation, or where the oblong body is "sideways"—the fishing weight is not pulled through the water in an end-to-end manner in this case. Consider the case where this fishing rig is cast and then reeled in by the angler. The surface of the sidewall of the fishing weight's oblong body that may be associated with the first location may project at least generally upwardly when the fishing line is being reeled in, while the surface of the sidewall of the fishing weight's oblong body that may be associated with the second location may project "rearwardly" when the fishing line is being reeled in ("rearwardly" being the opposite direction that the fishing weight is being dragged through the water while being reeled in by an angler).

BRIEF DESCRIPTION OF THE FIGURES

FIG. 2b is a perspective view of one variation of the fishing weight of FIG. 2a.

FIG. 2c is a perspective view of another variation of the fishing weight of FIG. 2a.

FIG. 3 is a cross-sectional view of the fishing weight of FIG. 2a.

DETAILED DESCRIPTION

Figure 1:
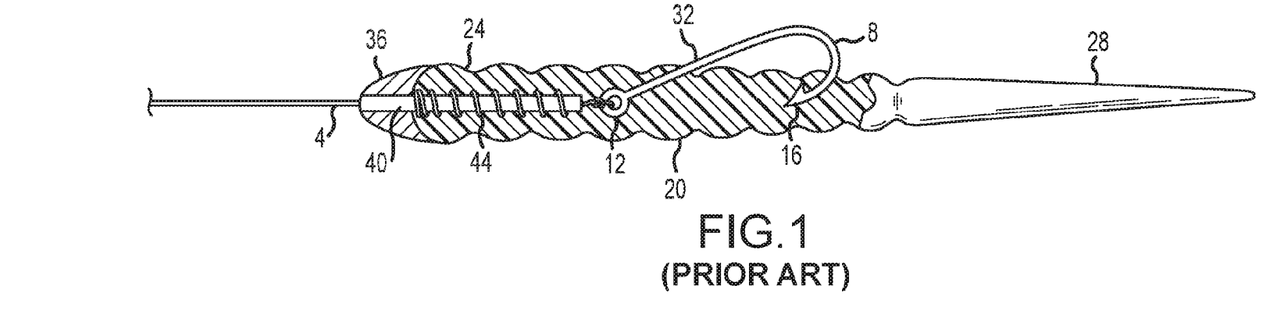
FIG. 1 is a partial cross-sectional side view of what is commonly referred to as a Texas rig setup for fishing applications, together with a prior art bullet weight.

Referring to FIG. 1, a conventional Texas rig setup is illustrated and includes a hook 8, plastic worm 20 (e.g., an artificial bait), and weight 36. The weight 36 may be positioned on a free end of the fishing line 4 that extends from a fishing rod and reel (not shown), and then the hook 8 may be tied thereto. The plastic worm 20 may be in the form of any one of the large variety of different colors or styles of worms, soft baits, or other artificial baits that are presently available on the retail market. Typically, the plastic worm 20 includes a body portion 24 and a tail portion 28, with the body portion 24 being in the form of an elongated cylinder or the like. Hook 8 includes an eyelet 12 at one end thereof and a sharp barbed point 16 on the other end. In rigging the plastic worm 20 in a Texas rig arrangement, a fishing line 4 is tied (e.g., securely attached) to the eyelet portion 12 of hook 8, then hook 8 is placed in relation to plastic worm 20 such that the barbed point 16 is placed against the center of an end face of plastic worm 20. The hook 8 is then pushed into the body portion 24 of the plastic worm 20 such that the barbed point 16 passes through the central axis of the worm 20 at a front portion thereof and then exits through a side of the plastic worm 20 to define an opening 32 (i.e., the opening 32 on the side of the plastic worm 20 is created by the sharp barbed point 16 of fishing hook 8). The fishing hook 8 is then pulled out through the opening 32, but such that the eyelet 12 of hook 8 remains embedded within the body portion 24 of the plastic worm 20. Thereafter, the hook 8 can be rotated and the barbed point 16 embedded in the body portion 24 of the plastic worm 20 if desired. After the plastic worm 20 and hook 8 are rigged in the Texas rig setup, the weight 36 may be moved down the fishing line 4 until a tube member 40 of the weight 36 butts up against the end of the plastic worm 20. The tube member 40 may then be inserted into the plastic worm 20 until the head of weight 36 contacts the adjacent end of the plastic worm 20. A helical spring 44 located on the outer surface of the tube member 40 may be used to engage an interior portion of the plastic worm 20 and tends to prevent disengagement of the weight 36 and attached tube member 40 from the plastic worm 20.

Figure 2A:
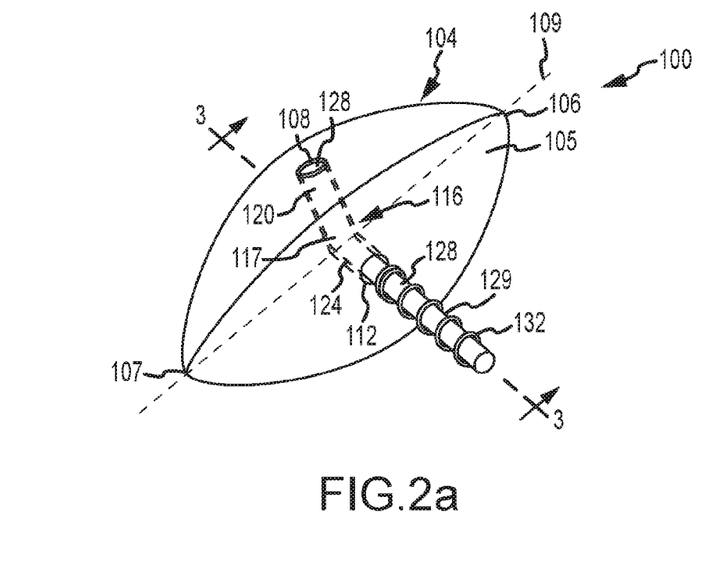
FIG. 2a is a perspective view of one embodiment of a fishing weight having an oblong body with a non-linear passage extending therethrough.

A perspective view of one embodiment of a fishing weight 100 is illustrated in FIG. 2a. This fishing weight 100 may be used in a Texas rig setup or any other fishing rig setup. The fishing weight 100 includes a generally ovoid or oblong-shaped body 104 (hereafter "oblong body 104"). Preferably, the oblong body 104 is in the shape of an American football. As will be discussed in more detail below, the fishing weight 100 is oriented so that its long axis is at least generally orthogonally disposed to the direction that the fishing weight 100 is being pulled through the water when mounted on fishing line. The configuration of the fishing weight 100 and its orientation when being pulled through the water is believed to reduce snagging and interference with underwater vegetation and other objects. The oblong body 104 may be formed from any appropriate material such as metal, and including without limitation lead, tungsten, brass, steel, or any combination thereof. Any appropriate coating or combination of coatings could be used on the exterior of the oblong body 104. The oblong body 104 may be any appropriate color or combination of colors.

Generally, the oblong body 104 includes a sidewall 105 extending between a first end 106 and a second end 107 of the oblong body 104, the first and second ends 106, 107 being spaced along a central axis 109 extending through the oblong body 104. Preferably, the oblong body 104 is generally symmetric about and proceeding along the central axis 109. The central axis 109 may be characterized as that reference axis about which the oblong body 104 of the fishing weight 100 may be symmetrically disposed.

A passage 116 extends completely through the oblong body 104 and intersects with its sidewall 105 at a first location 108 and at a second location 112. This passage 116 allows a fishing line to extend through the oblong body 1041, such that the fishing weight 100 may be characterized as being slidably mountable on fishing line.

There are a number of characterizations regarding the passage 116. One is that the centerline of the passage 116 may be contained within a reference plane that is orthogonal to the central axis 109 and that bisects the oblong body 104 between its first and second ends 106, 107 (e.g., a first half of the oblong body 104 would be disposed on one side of such a reference plane and would have the first end 106, and a second half of the oblong body 104 would be disposed on the opposite side of such a reference plane and would have the send end 107). The passage 116 may also be characterized as including a first passage section 120 that is linear and that extends from the first location 108 into the oblong body 104 (e.g., at least substantially to the central axis 109), along with a second passage section 124 that is linear and that extends from the second location 112 into the oblong body 104 (e.g., at least substantially to the central axis 109). The first passage section 120 and the second passage section 124 may intersect at least generally at the central axis 109. A short arcuate segment may interconnect the first passage section 120 and the second passage segment 124 at least generally at the central axis 109.

Figure 3:
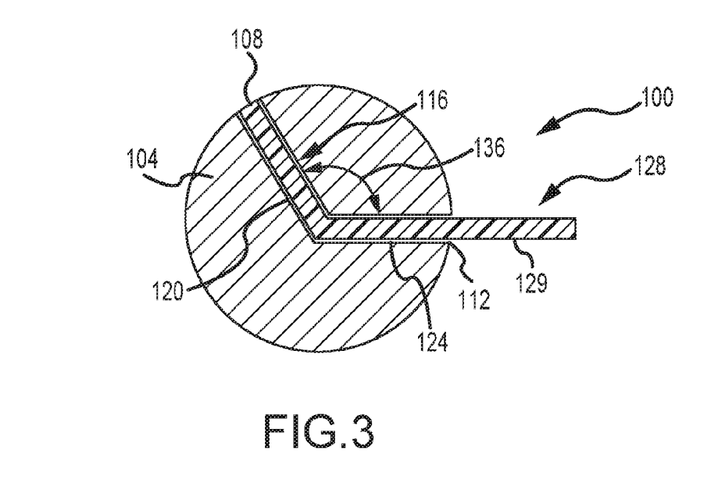

With reference to FIG. 3, a cross-sectional view of the fishing weight 100 of FIG. 2a is presented. As seen in FIGS. 2a and 3, the passage 116 extends other than linearly through the oblong body 104. More specifically, the first and second passage sections 120, 124 are disposed other than collinear with each other and are at least generally disposed in different orientations. An included angle 136 between the first and second passage sections 120, 124 is greater than about 90 degrees in one embodiment, and is within a range of 120 degrees to 150 degrees (inclusive) in another embodiment.

The fishing weight 100 of FIGS. 2a and 3 also includes a tube 128 disposed within at least a portion of the passage 116. It should be noted that the entirety of the tube 128 is shown in cross-section in FIG. 3 for clarity, versus just its wall thickness. As seen in FIGS. 2a and 3, the tube 128 generally includes a first end that terminates at or near the first location 108 on the sidewall 105 of the oblong body 104. However, the opposite end of the tube 128 extends beyond the second location 112 on the sidewall 105 of the oblong body 104. That is, a first tube section 129 of the tube 128 extends beyond the second location 112 on the sidewall 105 of the oblong body 104. As such, the tube 128 extends the full length of the passage 116 through the oblong body 104, and furthermore extends beyond the oblong body 104 to define a first tube section 129. Any appropriate way of integrating the tube 128 with the oblong body 104 may be utilized for purposes of the fishing weight 100. For instance, the tube 128 could be provided and then the oblong body 104 could be formed (e.g., molded or casted) around the tube 128, thus also simultaneously forming the passage 116. In this case, the tube 129 may be characterized as being at least partially embedded within the oblong body 104. Alternatively, the oblong body 104 could be formed, together with its internal passage 116, and then the tube 128 could be inserted into the passage 116, with the tube 128 being appropriately secured to the oblong body 104 in any appropriate manner (e.g., such that the tube 128 does not move relative to the oblong body 104 within the oblong body 104). The tube 128 can be formed from any appropriate material (e.g., plastics, metals). Any appropriate coating or combination of coatings could be used on the tube 128, or at least the first tube section 129 (e.g., Teflon®).

The outer surface of the first tube section 129 includes a spring 132 to reduce the potential of artificial or soft bait (that has been mounted to the first tube section 129 in a manner that will be discussed in more detail below) from inadvertently disengaging from the first tube section 129. As shown in FIG. 2a but removed from FIG. 3 for clarity, the spring 132 can be in the form of a helical spring that is appropriately attached to the outer surface of the first tube section 129 and/or to the oblong body 104 (e.g., by having an end portion of the spring 132 being embedded in the oblong body 104). The spring 132 can extend along any appropriate portion of the length of the first tube section 129, but preferably terminates prior to reaching a free of the first tube section 129 (e.g., to reduce the potential of fishing line, after exiting the first tube section 129, from becoming entangled in the spring 132). As will be shown in later figures, the spring 132 is adapted to pierce and enter artificial or soft bait. Thereafter, an angler can either rotate the artificial bait with respect to the spring 132 to mount the artificial bait onto the first tube section 129. Other ways to provide a desired interface between the fishing weight 100 and artificial bait being used in conjunction with the fishing weight 100 may be utilized. For example, serrations, knurls, projections, threads, or other such features may be incorporated on the outer surface of the first tube section 129 and in any appropriate manner to function as a retention member in relation to artificial bait mounted on the first tube section 129.

Figure 2B:
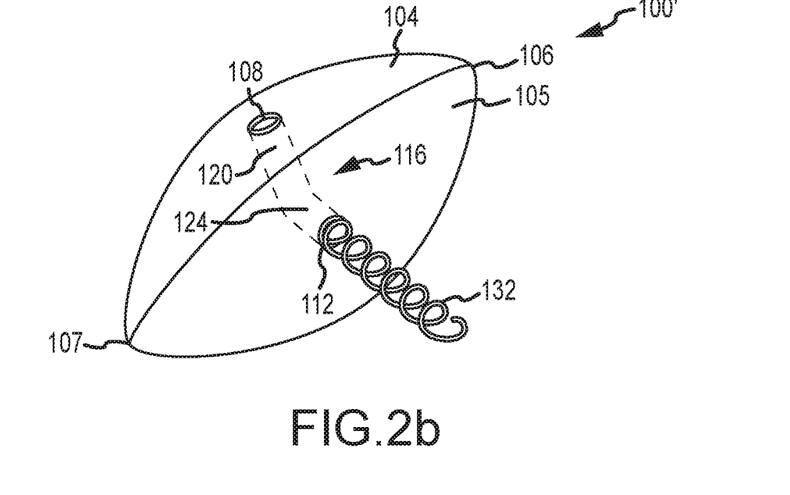

FIG. 2B presents a variation of the fishing weight 100 of FIGS. 2a and 3. Corresponding components between the two embodiments are identified by a common reference numeral. Those corresponding components that differ in at least some respect are identified by a "single prime" designation in FIG. 2b. The primary difference between the fishing weight 100 of FIG. 2a and the fishing weight 100' of FIG. 2b is that the fishing weight 100' of FIG. 2b does not use the above-described tube 128. Instead, the spring 132 is aligned with the passage 116 and extends from the second location 112 on the sidewall 105 of the oblong body 104. The spring 132 may be attached or fixed relative to the oblong body 104 in any appropriate manner, such as by an end portion of the spring 132 being embedded within the oblong body 104. The spring 132 may extend any appropriate distance from the oblong body 104. In yet another variation of the embodiment of FIG. 2a and not shown in the drawings, the above-described tube 128 may be utilized within the oblong body 104, the first tube section 129 may be eliminated (e.g., such that the tube 128 terminates at the second location 112 on the sidewall 105 of the oblong body 104, as well as at the first location 108 on the sidewall 105), and the spring 132 may be utilized and as shown in FIG. 2b.

Figure 2C:
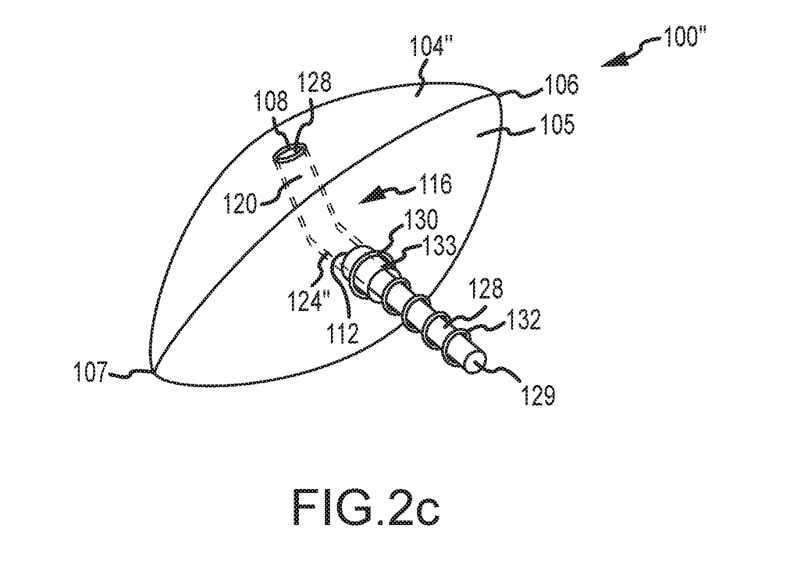

FIG. 2C presents yet another variation of the fishing weight 100 of FIGS. 2a and 3. Corresponding components between the two embodiments are identified by a common reference numeral. Those corresponding components that differ in at least some respect are identified by a "double prime" designation in FIG. 2c. In this embodiment, the oblong body 104" includes an integral extension or projection 133 that is hollow and that is aligned with the passage 116 at the second location 112 (e.g., the extension 133 may be integrally formed with the oblong body 104" such that there is no joint therebetween). The extension 133 includes at least one rib or collar 130 that serves to prevent, for instance, a skirt (not shown, but which may be mounted on the extension 133) from sliding off of the extension 133, where this skirt may imitate marine life. A spring 132 may be mounted on and appropriately secured to the extension 133. The extension 133 may be of any appropriate length (e.g., may extend any appropriate distance from the oblong body 104").

The extension 133 can be formed integrally with the oblong body 104" and as part of a casting process as previously noted. Alternatively, the extension 133 could be separately formed and separately mounted to the oblong body 104" in any appropriate manner. The rib 130 may be formed integrally with the extension 133 or can be incorporated after formation of the extension 133. The fishing weight 100" of FIG. 2c could also utilize at least part of the above-noted tube 128 in conjunction with the hollow extension 133 (e.g., the tube 128 could extend from the first location 108 on the sidewall 105 of the oblong body 104", through the passage 116, and past an end of the extension 133 as shown in FIG. 2c). The rib 130 could also be utilized on the above-noted first tube section 129, and may be incorporated by the first tube section 129 in any appropriate manner.

Figure 4:
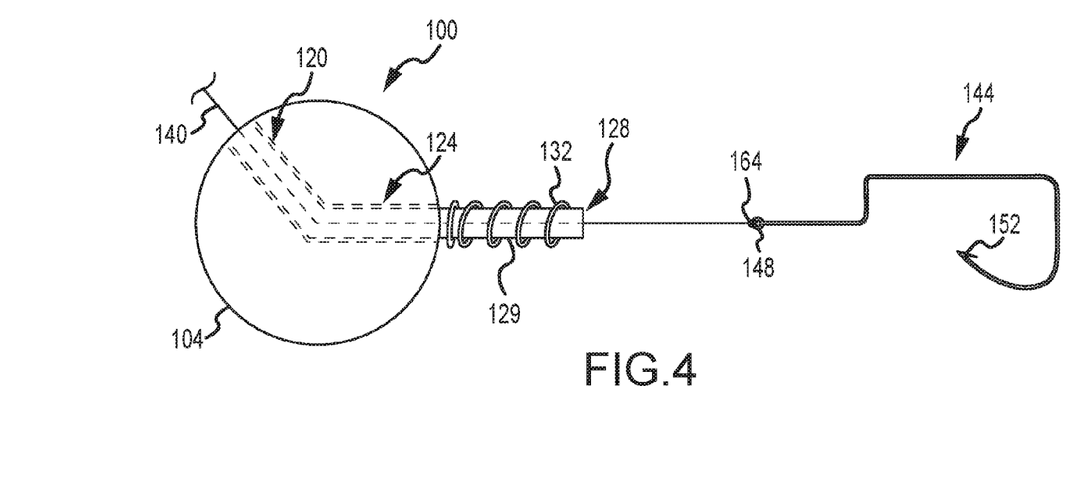
FIG. 4 is a side view of a fishing rig that includes the fishing weight of FIG. 2a, fishing line, and an offset hook tied onto the fishing line.

FIG. 4 is a side view of the fishing weight 100 with a fishing line 140 disposed in the first passage section 120, the second passage section 124, and the tube 128, and with a hook 144 being attached to a free end thereof. It should be appreciated that the variations of the fishing weight 100 discussed above may be used as well in this basic setup. Preferably, the fishing line 140 is first pulled through the fishing weight 100 and then mounted to the hook 144. However, the fishing line 140 could first be attached to the hook 144, and then threaded through the first tube section 129, the second passage section 124, and then the first passage section 120 of the oblong body 104 of the fishing weight 100.

The hook 144 generally includes a barbed end 152, in addition to an eyelet 148 for connecting to the fishing line 140. Generally, the fishing line 140 is mounted to the eyelet 148 by, for instance, tying a knot 164 through and around the eyelet 148. The hook 144 is in the form of an offset shank worm hook, although any appropriate type of fishing hook can be utilized with the fishing weight 100. For instance, floating worm hooks, keel fly hooks, red bait hooks, and many other types of fishing hooks can be utilized with the fishing weight 100.

Figure 5:
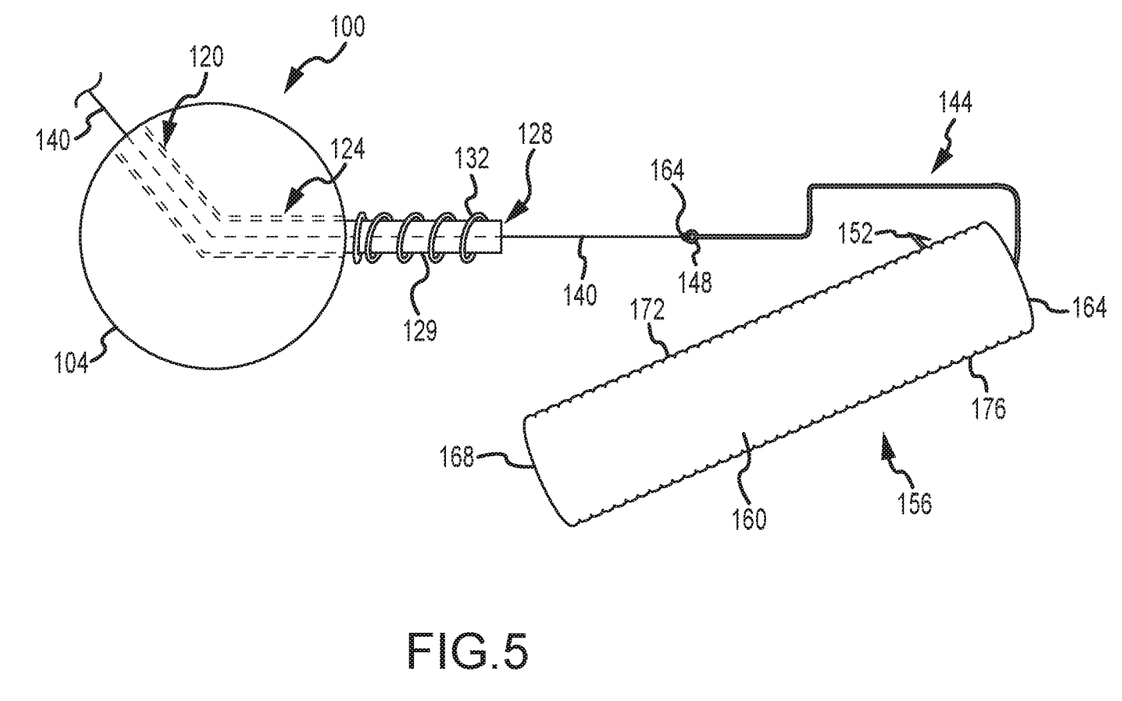
FIGS. 5-7 illustrate a technique for incorporating artificial bait with the fishing rig from FIG. 4.
Figure 6:
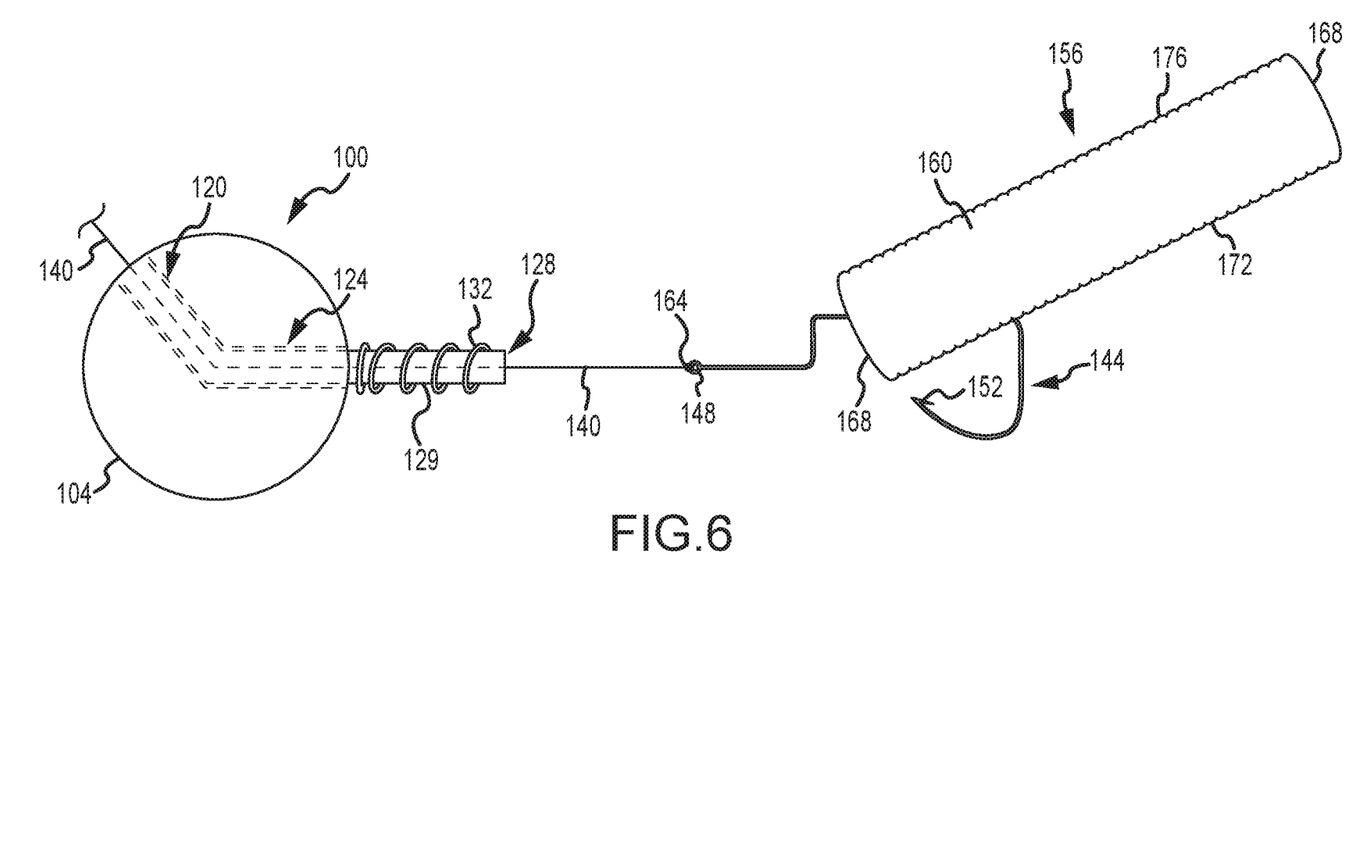
Figure 7:
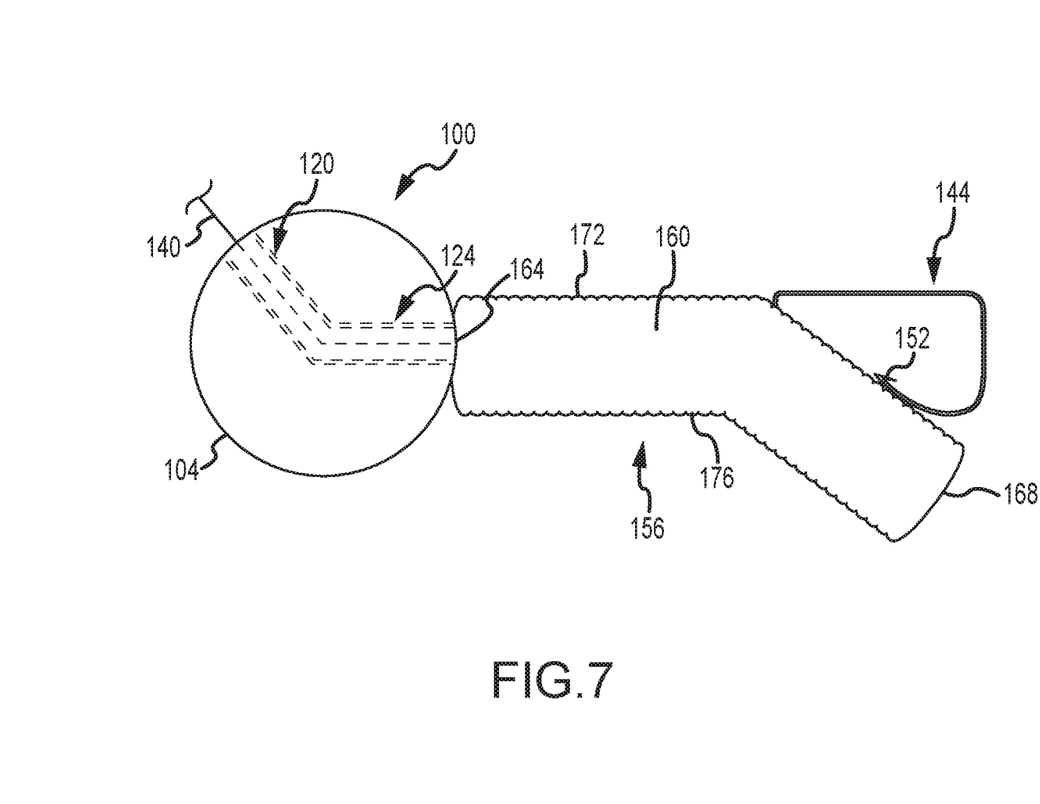

FIGS. 5-7 illustrate a method of mounting artificial bait 156 onto the arrangement shown in FIG. 4. Although the mounting method will be shown with respect to the embodiment of FIGS. 2a and 3, it will be appreciated that this same technique can be used with the other embodiments described herein. The artificial bait 156 may be of any appropriate type, for instance a worm, grub, craws, lizards, tubes, and the like.

The artificial bait 156 includes a body portion 160, first end 164, second end 168, first side 172, and second side 176. Initially and as shown in FIG. 5, the angler uses the barbed end 152 of the hook 144 to pierce the first end 164 of the artificial bait 156. Thereafter, the angler continues to insert the barbed end 152 through the artificial bait 156 until the barbed end 152 exits out and pierces a portion of the first side 172 of the artificial bait 156. Once the barbed end 152 exits the first side 172 of the artificial bait 156, the angler continues pushing the rest of the body of the hook 144 through the two pierced holes of the artificial bait 156.

As shown in FIG. 6, the second side 176 of the artificial bait 156 may eventually face in an upward direction. To affect the Texas rig arrangement, the angler at this point may rotate the body 160 of the artificial bait 156 about the hook 144 such that the majority of the body 160 of the artificial bait 156 is situated below the hook 144. Thereafter, the angler continues pushing the remainder of the body of the hook 144 and the eyelet 148 and the tube 128 through the body 160 of the artificial bait 156 until the first end 164 of the artificial bait 156 abuts the oblong body 104 of the fishing weight 100, as shown in FIG. 7. At this point, the first tube section 129, eyelet 148, and a portion of the body of hook 144 are embedded within the artificial bait 156, and the barbed end 152 of the hook 144 is resting along a portion of the first side 172 of the artificial bait 156. This arrangement is known as a Texas rig. While the first end portion 164 of the artificial bait 156 abuts the oblong body 104 of the fishing weight 100 in the illustrated embodiment, other embodiments contemplate that a portion of the artificial bait 156 need not be in contact with the oblong body 104 of the fishing weight 100.

Although the barbed end 152 is shown as resting on the first side 172 of the artificial lure 156 in FIG. 7, it will be appreciated that the barbed end 152 could be arranged so that it punctures or is otherwise embedded within the artificial bait 156. Further, although it may be preferable to rotate the artificial bait 156 only about the hook 144 because of the ease of rotation due to the smaller diameter of the hook 144 relative to the diameter of the first tube section 129, it will be appreciated that an angler could alternatively first push the entire hook 144 and at least a portion of the first tube section 129 through the artificial bait 156, and then rotate the artificial bait 156 about the first tube section 129 and hook 144 so that the barbed end 152 is able to either rest on or pierce the first side 172 of the artificial bait 156.

The fishing weights 100, 100', and 100" are advantageous in a number of respects. These will be discussed in relation to only the fishing weight 100, but are equally applicable to the fishing weights 100' and 100". Initially, the shape of the oblong body 104 of the fishing weight 100, along with the orientation of the oblong body 104 as it travels through the water (e.g., sideways versus end-to-end), provides a number of benefits, including without limitation: 1) enhancing the ability of the fishing weight 100 to deflect off of rocks, trees, vegetation, debris, and the like as the fishing weight 100 is being reeled in by an angler; 2) reduces the potential that the bait (that is integrated with the fishing weight 100) will roll over; 3) reduces the potential of the fishing weight 100 becoming stuck or snagged while fishing; 4) allows the fishing weight 100 and any associated bait to "stand upright" briefly after initially landing on a bottom (e.g., a lake bed) after having been "popped off" of the bottom; and 5) provides an arching while flipping motion when vertically jigging bait incorporated with the fishing weight 100.

The passage 116 through the oblong body 104 provides a number of advantages. Having the fishing line enter the oblong body 104 more toward the top thereof reduces the potential of the fishing line coming into direct contact with the bottom while fishing. Having the fishing line extend through the oblong body 104 also disposes the knot (where the line is tied to a hook) behind the oblong body 104, which reduces the potential of the knot becoming damaged while fishing (a damaged knot may lead to a loss of the hook and/or associated bait).

Using a spring 132 with the fishing weight 100 may be used to lock bait to the fishing weight 100. Moreover, the spring 132 facilitates keeping the fishing weight 100 and any associated bait in position for a more natural appearance that should attract fish.

The above described invention, while including the preferred embodiment and the best mode of the invention known to the inventor at the time of filing are given as illustrative examples only. It will be readily appreciated that many deviations may be made from the specific embodiments disclosed in the specification without departing from the spirit and scope of the invention. Accordingly, the scope of the invention is to be determined by the claims below rather than being limited to the specifically described embodiments above.

What is claimed is:

1. A fishing rig, comprising:
    a fishing weight comprising an oblong body comprising first and second ends and a sidewall, wherein said first and second ends are spaced along a central reference axis that defines a long axis of said oblong body, wherein said sidewall extends between said first and second ends and further extends about said central reference axis, wherein said sidewall of said oblong body is at least generally symmetrically disposed about said central reference axis, wherein said oblong body further comprises a passage that extends from a first location on said sidewall, through said oblong body, and to a second location on said sidewall, wherein each of said first and second locations are spaced from each of said first and second ends, wherein said first and second locations are disposed at different radial locations about said central reference axis in an end view of said oblong body, wherein an entirety of said passage between said first and second locations is internal of said oblong body and comprises first and second passage sections, wherein said first and second passage sections are disposed other than collinear with each other, wherein an included angle between said first and second passage sections is greater than 90, and wherein said first and second passage sections intersect at least generally at said central reference axis of said oblong body;
    a fishing line that extends through said passage of said fishing weight and that is slidable relative to said oblong body of said fishing weight, wherein said fishing line extends out of said oblong body through and beyond said second location on said sidewall of said oblong body;
    a hook that is attached to a portion of said fishing line that extends out of said oblong body through and beyond said second location on said sidewall of said oblong body, wherein an entirety of said hook is spaced from said fishing weight; and
    artificial bait, wherein said fishing line extends through said artificial bait such that said artificial bait is positioned between said hook and said fishing weight to maintain said hook in spaced relation to said fishing weight, and wherein said artificial bait is movable relative to each of said fishing weight, said fishing line, and said hook when assembling said fishing rig;
    wherein said first and second locations on said sidewall of said oblong body for said fishing weight are disposed such that when said fishing weight is pulled through water by said fishing line: a) said central reference axis is at least generally orthogonal to a direction of movement of said oblong body through the water; b) said second location on said sidewall of said oblong body trails said first location on said oblong body in relation to said direction of movement of said oblong body through the water; c) said hook trails said fishing weight in relation to said direction of movement of said oblong body through the water; d) said second location on said sidewall of said oblong body projects oppositely to said direction of movement of said oblong body through the water; and e) said first location on said sidewall of said oblong body projects at least generally upwardly in relation to said direction of movement of said oblong body through the water.

2. The fishing rig of claim 1, wherein said passage extends into said oblong body orthogonally to said sidewall at each of said first and second locations.

3. The fishing rig of claim 1, wherein said oblong body is at least generally football-shaped.

4. The fishing rig of claim 1, wherein said passage extends other than linearly through said oblong body.

5. The fishing rig of claim 1, wherein said first and second passage sections are disposed at an angle relative to each other that is within a range of 120° to 150°, inclusive.

6. The fishing rig of claim 1, wherein said first and second passage sections are each linear and are disposed in different orientations.

7. The fishing rig of claim 6, wherein an included angle between said first and second passage sections is within a range of 120° to 150°, inclusive.

8. The fishing rig of claim 1, wherein a centerline of said passage is contained within a reference plane that is orthogonal to said reference axis and bisects said oblong body between said first and second ends.

9. The fishing rig of claim 1, further comprising a tube disposed within said passage.

10. The fishing rig of claim 9, wherein said tube terminates at said sidewall at each of said first and second locations.

11. The fishing rig of claim 9, wherein said tube terminates at said sidewall at said first location, and comprises a first tube section that extends beyond said oblong body from said second location.

12. The fishing rig of claim 11, further comprising a spring disposed on said first tube section.

13. The fishing rig of claim 12, wherein one end of said spring is anchored in said oblong body.

14. The fishing rig of claim 12, wherein said artificial bait is mounted on said spring and extends from said spring away from said fishing weight.

15. The fishing rig of claim 11, further comprising a retention member associated with said first tube section, wherein said artificial bait is mounted on said first tube section and is engaged by said retention member to secure said artificial bait relative to said fishing weight.

16. The fishing rig of claim 15, wherein said retention member comprises at least one of a serrated surface, a knurled surface, threads, or a spring.

17. The fishing rig of claim 1, wherein said passage extends from said first location on said sidewall, into said oblong body, and toward said central reference axis, and wherein said passage extends from said second location on said sidewall, into said oblong body, and toward said central reference axis.

18. The fishing rig of claim 1, wherein a depth of said passage relative to said sidewall continually changes proceeding along said passage.

* * * * *